US012554602B2

(12) United States Patent
Chandra et al.

(10) Patent No.: US 12,554,602 B2
(45) Date of Patent: Feb. 17, 2026

(54) PROACTIVE RESERVATION OF FIELD REPLACEABLE UNITS USING PREDICTIVE FAILURE ANALYSIS AND ANALYTICS

(71) Applicant: INTERNATIONAL BUSINESS MACHINES CORPORATION, Armonk, NY (US)

(72) Inventors: Rashmi Chandra, Santa Clara, CA (US); Beth Ann Peterson, Tucson, AZ (US); Matthew G. Borlick, Tucson, AZ (US); Lokesh Mohan Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/660,346

(22) Filed: May 10, 2024

(65) Prior Publication Data

US 2025/0348391 A1 Nov. 13, 2025

(51) Int. Cl.
*G06F 11/00* (2006.01)
*G06F 11/20* (2006.01)

(52) U.S. Cl.
CPC ........ *G06F 11/2035* (2013.01); *G06F 11/004* (2013.01); *G06F 2201/85* (2013.01)

(58) Field of Classification Search
CPC .................. G06F 11/2035; G06F 11/004
See application file for complete search history.

(56) References Cited

U.S. PATENT DOCUMENTS

| 5,568,491 | A | * | 10/1996 | Beal ................... G06F 11/2257 714/712 |
| 10,552,729 | B2 | | 2/2020 | Bacha et al. |
| 10,628,251 | B2 | | 4/2020 | Dome et al. |
| 11,513,925 | B2 | | 11/2022 | Sethi et al. |
| 2021/0409489 | A1 | * | 12/2021 | Speasl ................... H04L 63/123 |
| 2022/0158818 | A1 | * | 5/2022 | Jiang ....................... H04L 63/12 |

FOREIGN PATENT DOCUMENTS

CN 112652351 A * 4/2021 ............. G11C 29/44

OTHER PUBLICATIONS

Choubey, S., et al., "A Holisitic End-to-End Prescriptive Maintenance Framework," SpringerLink, : doi: 10.1007/s41688-020-00045-z, Feb. 2020, 20 pp.

* cited by examiner

*Primary Examiner* — Amine Riad
(74) *Attorney, Agent, or Firm* — KONRAD, RAYNES, DAVDA & VICTOR LLP; Rabindranath Dutta

(57) ABSTRACT

A computational device determines whether a generated system event in the computational device is a critical error or a non-critical error. In response to determining that the generated system event is a critical error caused by a first field-replaceable unit (FRU), the critical error is processed to initiate tasks that lead to replacement of the first FRU in the computational device to eliminate the critical error. In response to determining that the generated system event is a non-critical error caused by a second FRU, operations are performed to proactively reserve a substitute FRU to replace the second FRU to eliminate the non-critical error, in anticipation of the second FRU failing at a future time to cause another critical error.

17 Claims, 7 Drawing Sheets

PROACTIVE RESERVATION OF FIELD REPLACEABLE UNITS USING PREDICTIVE FAILURE ANALYSIS AND ANALYTICS

BACKGROUND

Embodiments relate to a method, system, and computer program product for proactive reservation of field replaceable units using predictive failure analysis and analytics.

In a computer system, a field-replaceable unit (FRU) is a part that can be removed and replaced by a repairer without having to send the entire computer system to a repair facility. The defective part may be found by troubleshooting procedures, removed, and either discarded or shipped back to the factory for repair. The new part may be installed in place of the defective part.

A computing environment may be comprised of a storage controller that is coupled to a plurality of storage devices. The storage controller allows one or more host computational devices to access data stored in storage devices. The storage controller and the storage devices may have FRUs included within them. FRUs may also be present in a computational device that is not a storage controller.

SUMMARY

Provided are a method, system, and computer program product in which a computational device determines whether a generated system event in the computational device is a critical error or a non-critical error. In response to determining that the generated system event is a critical error caused by a first field-replaceable unit (FRU), the critical error is processed to initiate tasks that lead to replacement of the first FRU in the computational device to eliminate the critical error. In response to determining that the generated system event is a non-critical error caused by a second FRU, operations are performed to proactively reserve a substitute FRU to replace the second FRU to eliminate the non-critical error, in anticipation of the second FRU failing at a future time to cause another critical error.

In additional embodiments, an alert is transmitted proactively in anticipation of a failure of the second FRU.

In yet additional embodiments, a parts management database is queried to determine whether a blockchain certified FRU to replace the second FRU is available. In response to determining that the blockchain certified FRU to replace the second FRU is available, the blockchain certified FRU is reserved for replacement of the second FRU.

In further embodiments, in response to determining that the blockchain certified FRU to replace the second FRU is not available, an alert that indicates unavailability of parts availability to substitute the second FRU is transmitted.

In certain embodiments, incidences of prior actual replacements of the second FRU are taken into consideration to determine whether to request anticipatory replacement of the second FRU.

In additional embodiments, operations are performed to execute analytics on the generated system event and associated severity of errors, based on recent hardware failures and other factors, and further operations are performed to store a remediation in a file that is downloadable on demand.

In certain embodiments, the computational device is a storage controller, wherein a proactive reservation of FRUs is performed by using predictive failure determination mechanisms and a continuous FRU analytics learning model.

BRIEF DESCRIPTION OF THE DRAWINGS

Referring now to the drawings in which like reference numbers represent corresponding parts throughout.

DETAILED DESCRIPTION

Figure 1:
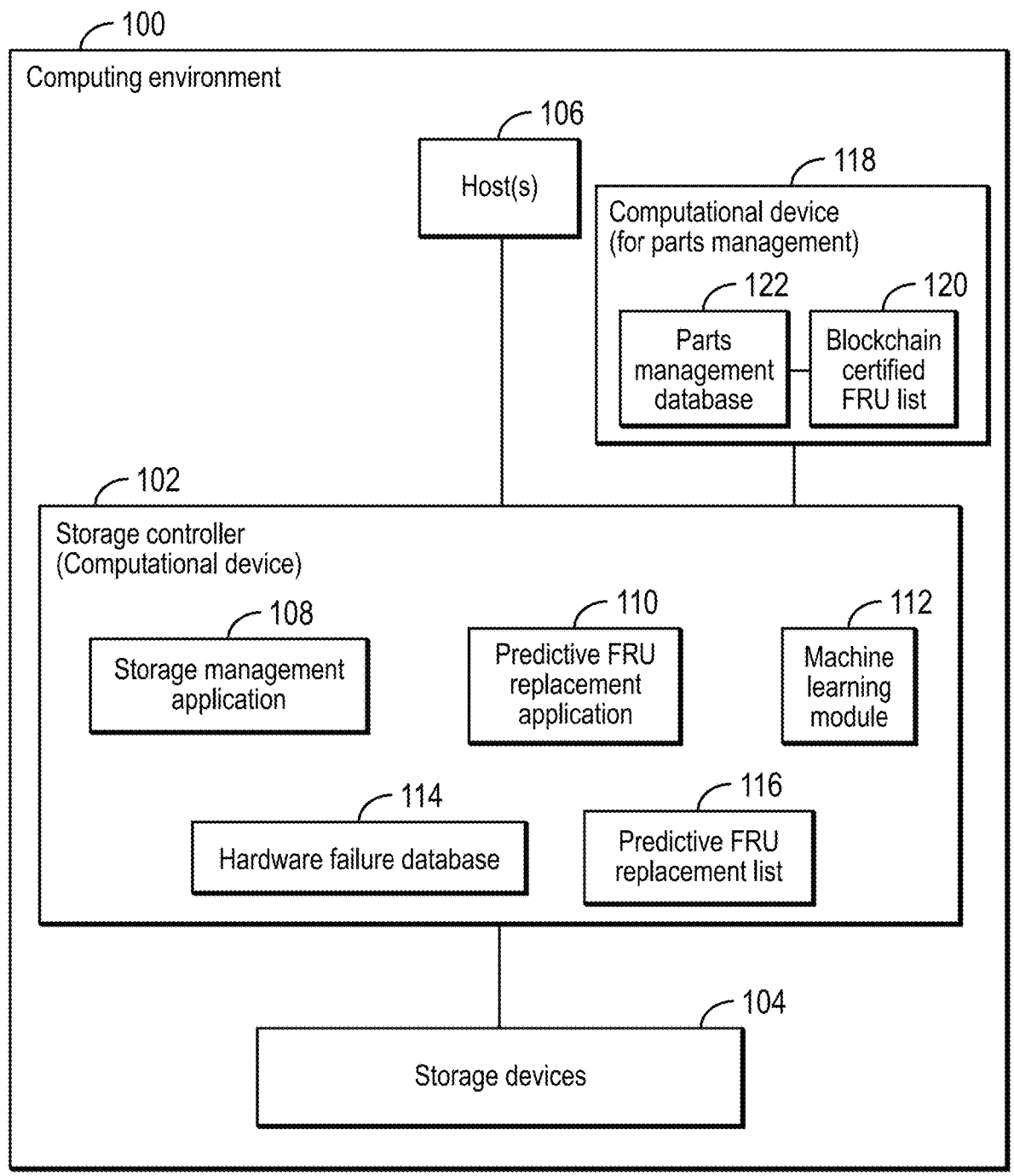
FIG. 1 illustrates a block diagram of a computing environment, in accordance with certain embodiments.

In the following description, reference is made to the accompanying drawings which form a part hereof and which illustrate several embodiments. It is understood that other embodiments may be utilized, and structural and operational changes may be made.

A storage controller firmware may continuously monitor hardware behavior in the storage controller. If any unusual hardware behavior is noticed, the firmware may log a temporary error. A storage controller microcode problem analyzer may apply a predetermined threshold to the temporary errors, and a permanent error may be logged when the temporary errors exceed the predetermined threshold.

User layer problem analysis may monitor for permanent hardware errors and may communicate an alert to a support center as well as a customer to replace the failing hardware. The analysis may be built into the code based on the failure analysis performed on data offloaded from the system. There is no near-term automatic remediation in certain existing mechanisms. In addition, certain existing mechanisms do not check for parts availability. Due to supply chain issues and parts shortages, hardware replacements may take longer than expected, and many times this may result in customer complaints to a service planning organization (referred to as service planning) or to other organizations that may be in charge of the repair or replacement of parts.

Certain embodiments send proactive alerts to service planning on a potential need for an FRU even before a problem has occurred. This proactive alert gives service planning a sufficient amount of time to reserve an available FRU or procure an FRU from a different warehouse if necessary.

Service planning may verify that FRUs are certified through a spare part blockchain process for authenticity. The blockchain process may verify that the FRU is certified either as brand-new spare part by storage controller manufacturing or is a refurbished spare-part by a storage controller certified sales program.

Service planning may include a report that includes hardware replacements including the number of replacements at a given hardware location in periodic reports. This information may be used in various ways:
(a) By service planning to forecast FRU stocking across warehouses and distribution centers;
(b) Each machine can report the hardware failure information. An application to analyze the information may analyze the FRU failure information and generate a pattern and suggested FRU recommendations that can be downloaded to the storage controller. The storage controller can use this information in analyzing future information. This may be a continuous process and can be extended to include recovery actions too.

Certain embodiments may implement the following features:
(a) Predictive failures by relying on an artificial intelligence module with a continuously evolving model built by combining FRU failure patterns seen locally on a storage controller with the FRU failure patterns seen across the entire storage controller population.
(b) Enhanced service planning mechanisms to allow proactive FRU reservation based on predictive failure analysis.
(c) FRU failure data mining may be performed across the entire storage controller population and analytics may be run to generate failure patterns that can be communicated back to storage controller to enhance the system's predictive FRU analysis mechanisms.

As a result of certain embodiments presented in this disclosure, improvements are made to a computational device by providing mechanisms for a proactive reservation of FRU using predictive failure determination mechanisms and a continuous FRU analytics learning model. There is also an enhancement to service planning mechanisms as the result of the operations performed in the embodiments.

FIG. 1 illustrates a block diagram of a computing environment 100, in accordance with certain embodiments.

A storage controller 102 is coupled to one or more storage devices 104 comprising one or more storage drives. The storage controller 102 represents the physical storage volumes stored in the storage devices 104 as logical storage volumes, and provides access to the logical storage volumes to the host 106, where the host 106 comprises a computational device that may access data stored in the storage devices 104 via the storage controller 102.

The storage controller 102 and the host 106 may in certain embodiments comprise any suitable computational device known in the art such as a server, a personal computer, a laptop, a telephony device, a mainframe, etc.

A storage management application 108 executes in the storage controller 102. The storage management application 108 may manage data stored in the storage volumes of the storage devices 104.

A predictive FRU replacement application 110 may execute in the storage controller, where the predictive FRU management application 110 may proactively indicate that certain FRUs are likely to fail in the near future and may be ordered in advance of failure. A machine learning module 112 may also be implemented in the storage controller 102 to support the operations of the predictive FRU replacement application 110. In certain embodiments, the storage management application 108, the predictive FRU replacement application 110, and the machine learning module 112 may be implemented in hardware, firmware, software, or any combination thereof.

A hardware failure database 114 maintained in the storage controller 102 may include information on every critical error reported in the storage controller 102. The list of FRU to be replaced in anticipation of a future error may be stored in a predictive FRU replacement list 116 in the storage controller 102. In alternative embodiments, the hardware failure database 114, the predictive FRU replacement list 116, the machine learning module 112, and the predictive FRU replacement application 110 may be maintained in a computational device that is different from the storage controller 102 but may still all be used to determine anticipatory FRU replacements and immediately needed FRU replacements in the storage controller 102.

A computational device 118 for parts management that includes a blockchain certified FRU list 120 in association with a parts management database 122 is maintained, in communication with the storage controller 102. The computational device 118 is used for determining via the blockchain certified FRU list 120, whether FRUs being reserved by the storage controller 102 are available for use by the storage controller 102.

Figure 2:
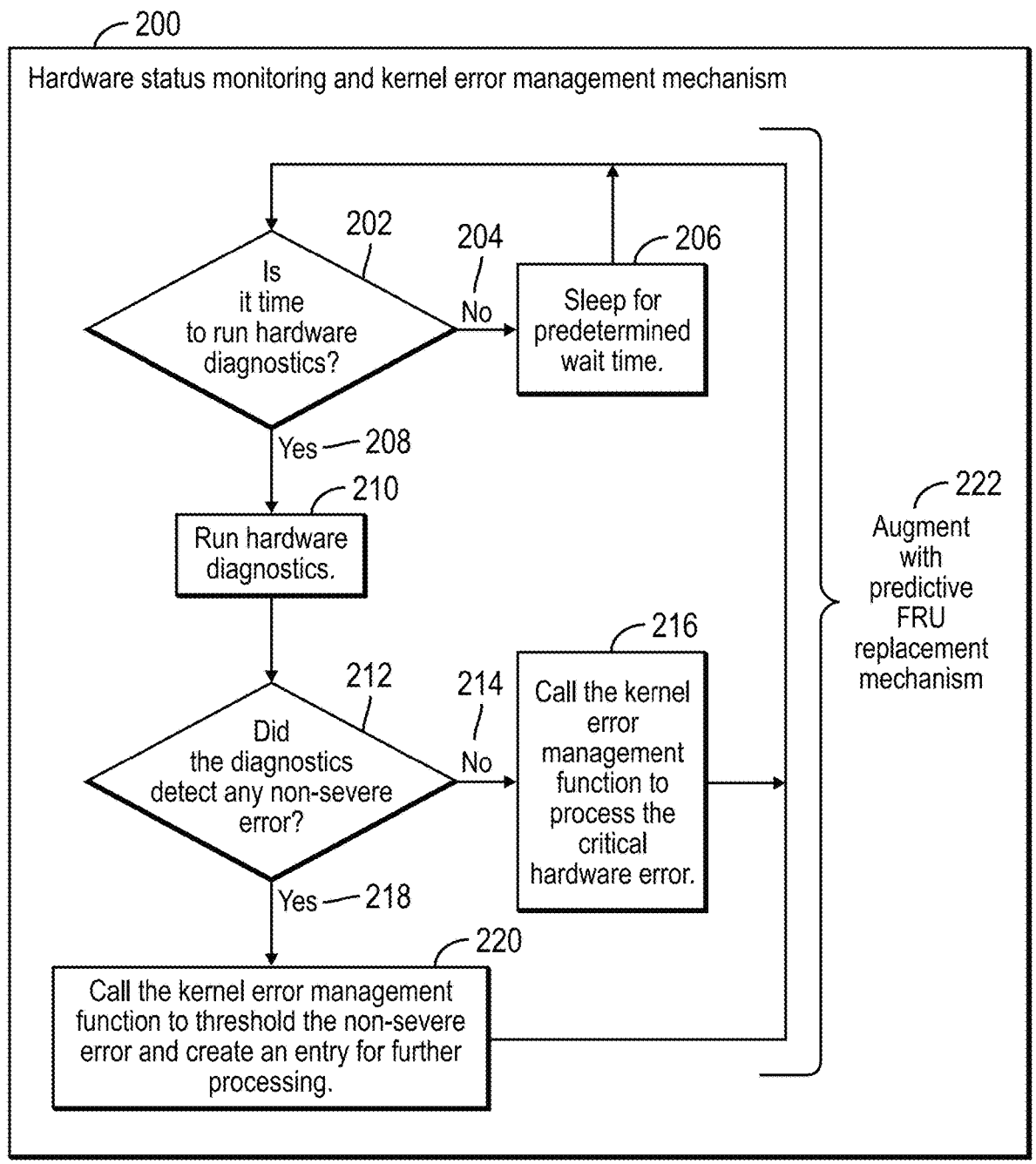
FIG. 2 illustrates a flowchart that shows a hardware status monitoring and kernel error management mechanism, in accordance with certain embodiments.

FIG. 2 illustrates a flowchart 200 that shows a hardware status monitoring and kernel error management mechanism, in accordance with certain embodiments. The operations shown in FIG. 2 may be performed by applications included in the storage controller 102.

Control starts at block 202, in which a determination is made in a storage controller 102 as to whether it is time to run hardware diagnostics. If not ("No" branch 204) control proceeds to block 206 where the process sleeps for a predetermined wait time and returns to block 202.

If at block 202, it is determined ("Yes" branch 208) that it is time to determine hardware diagnostics, then control proceeds to block 210 where hardware diagnostics is run. Control proceeds to block 212 where a determination is made as to whether the diagnostics detected any non-severe error, where a non-severe error may be referred to as a non-critical error, and a severe error may be referred to as a critical error. If not ("No" branch 214) then a critical hardware error (referred to as "critical error") has been detected and the process calls (at block 216) a kernel error management function to process the critical hardware error and control returns to block 202. A critical hardware error is usually an unrecoverable hardware error, or repeated hardware errors that have exceeded a predetermined threshold.

If at block 212 it is determined that the diagnostics detected a non-severe error ("Yes" branch 218) then control proceeds to block 220 in which the process calls the kernel error management function to apply a threshold to the non-severe error and create an entry for further processing if the threshold is exceeded. From block 220, control returns to block 202.

In certain embodiments, operations shown via blocks 202-220 are augmented with a predictive FRU replacement mechanism performed at least by the predictive FRU replacement application 110 that executes in the storage controller 102 (as shown via block 222).

Figure 3:
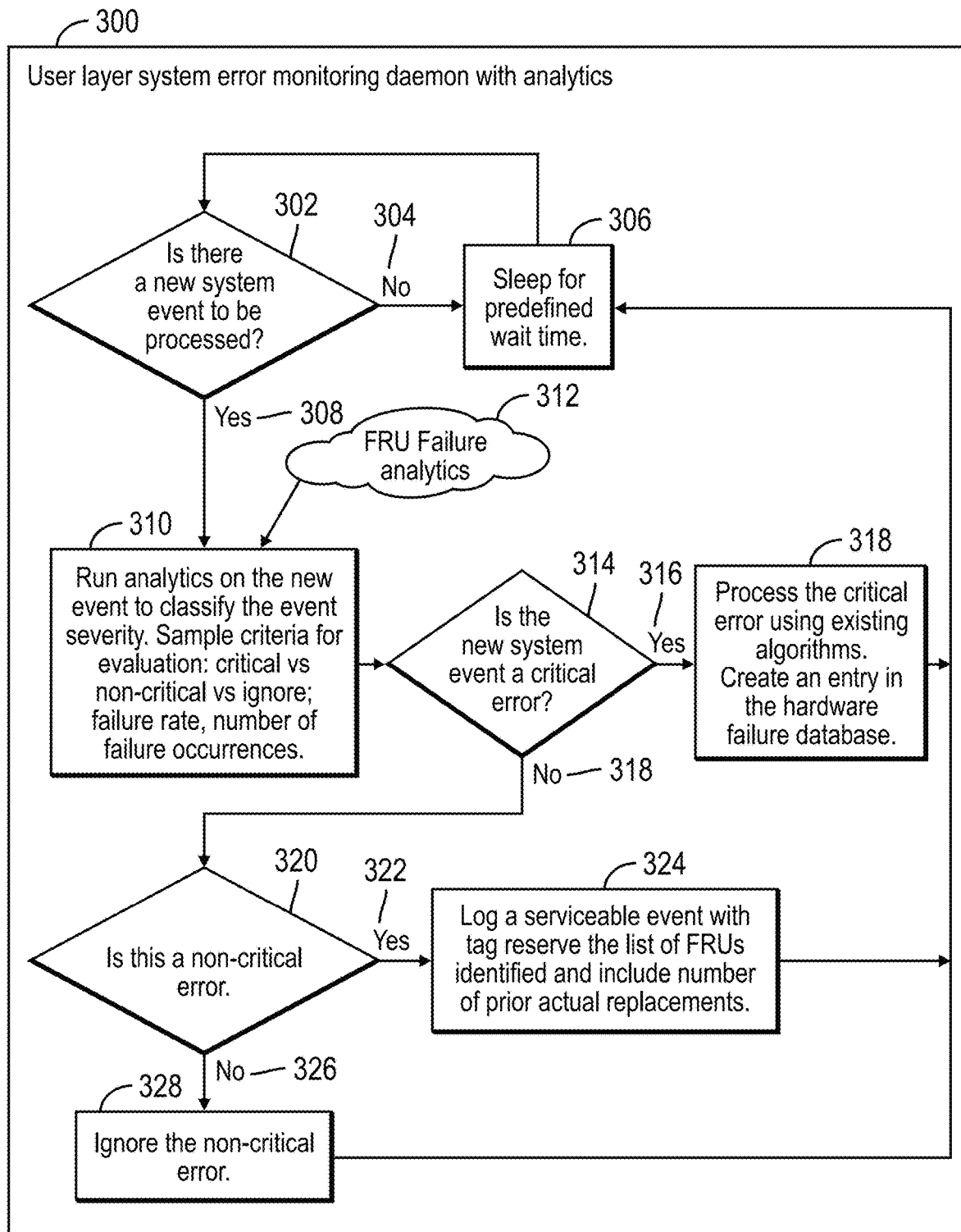
FIG. 3 illustrates a flowchart that shows a user layer system error monitoring daemon with analytics, in accordance with certain embodiments.

FIG. 3 illustrates a flowchart 300 that shows a user layer system error monitoring daemon with analytics, in accordance with certain embodiments. A user layer system error monitoring daemon is a computer program that runs in the background, performing various tasks without direct interaction from the user and may be part of the predictive FRU replacement application 110 or other applications that execute in the storage controller 102.

The storage controller user layer error monitoring daemon runs advanced analytics when it receives an alert. The analytics may have a set of rules to determine whether the alert needs to be sent immediately to a servicer for hardware replacement or whether a proactive FRU reservation is needed. If the alert does not match any rule, the event is ignored. If the event requires proactive FRU reservation, an alert (or serviceable event) is sent to the servicer with a list of FRUs to be reserved for a potential future use, and reported against list of frequently replaced hardware.

The analytics rules may be generated based on various criteria, such as:

(a) Whether the alert requires immediate attention or not;
(b) Whether the alert is a first-time failure against a hardware in a given location or whether the has been reported earlier. If reported earlier, it is considered whether was the alert was generated after a recent hardware replacement;
(c) Whether the alert is generated against an FRU that is managing a fabric of other FRUs; and
(d) Whether there are any other special recommendations against this FRU based on analytics that have been previously downloaded or that are now downloaded.

Control starts at block 302 in which the process determines whether there is a new system event to be processed. If not ("No" branch 304), the process sleeps (at block 306) for a predefined amount of time and control returns to block 302.

If at block 302, it is determined ("Yes" branch 308) that there is a new system event to be processed, then control proceeds to block 310 where the process uses an FRU failure analytics module 312 (e.g., the Machine learning module 112) to run analytics on the new event to classify the event severity. The sample criteria for evaluation in the failure analytics module may include: (a) whether an event is critical, non-critical or ignorable; (b) failure rates; and (c) number of failure occurrences. The FRU failure analytics module 312 is built by combining the knowledge of a local hardware failure database as well as the FRU failure patterns, and recommendations pulled in from the manufacturer The analytics are needed for non-critical errors.

From block 310 control proceeds to block 314 in which a determination is made as to whether the new system event is a critical error. If so ("Yes" branch 316), control proceeds to block 318 in which the critical error is processed using operations based on existing algorithms, and an entry is created in the hardware failure database 114. A critical hardware error (also referred to as "critical error") is usually an unrecoverable hardware error, or repeated hardware errors that have crossed threshold. The hardware failure database 114 maintains information of every critical error reported on a system. The duration the information is stored can be adjusted.

If at block 314 a determination is made that the new system event is not a critical error ("No" branch 318), then control proceeds to block 320 in which a determination is made as to whether the system event is a non-critical error.

If at block 320, it is determined that the system event is a non-critical error ("Yes" branch 322) then control proceeds to block 324 in which the process logs a serviceable event with a tag to reserve the list of FRUs identified and a record is kept of the number of prior actual replacements. The list of FRUs to be replaced in anticipation of a future error may be stored in the predictive FRU replacement list 116. The hardware considered for this kind of predictive FRU planning is the one that is replaced frequently. Control then returns to block 306.

If at block 320 it is determined that the system event is not a non-critical error "No" branch 326) then control proceeds to block 328 where the non-critical error is ignored, and subsequently control returns to block 306. Control returns to block 306 also from blocks 318 and 324.

Figure 4:
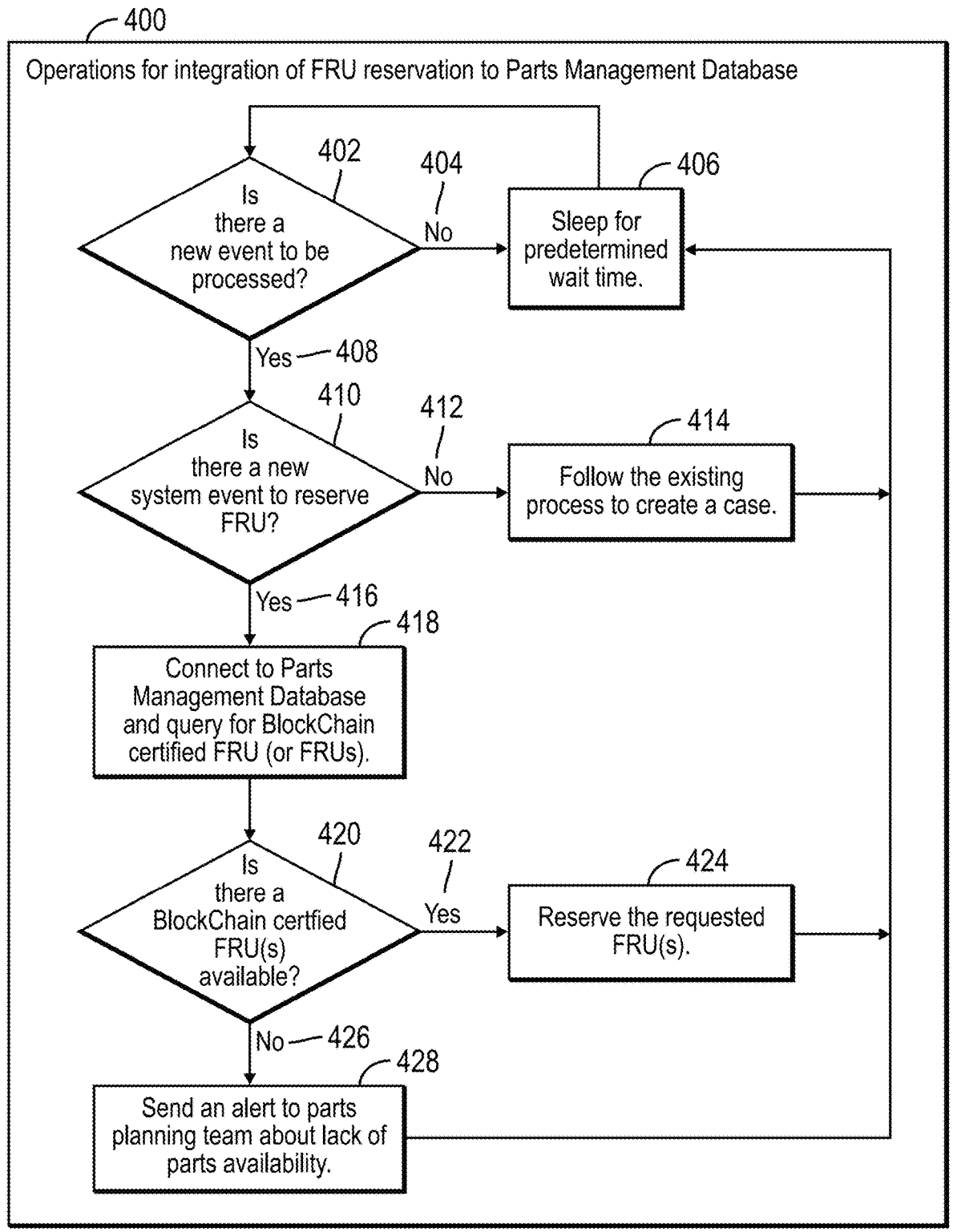
FIG. 4 illustrates a flowchart that shows operations for integration of FRU reservation to a parts management database, in accordance with certain embodiments.

FIG. 4 illustrates a flowchart 400 that shows operations for integration of FRU reservation to a parts management database 122 including a blockchain certified FRU list 120 stored in the computational device 118, in accordance with certain embodiments. The operations shown in FIG. 4 may be performed by applications included in the storage controller 102 and the computational device 118.

Case evaluation is one of the intermediate processing functions in the storage
controller's path to request for support. The case evaluation function examines the storage controller's serviceable event to determine whether the event is related to a hardware replacement (or call for support) or a proactive FRU reservation alert. If the event is related to a proactive FRU reservation, an alert is sent (via email or dashboard notification) to the nearest parts warehouse or distribution center. If the FRU is in stock, a soft reserve is placed for the FRU. Otherwise, an order is placed for FRU to be shipped to the warehouse. An FRU in stock implies that the FRU is a block chained certified FRU.

Control starts at block 402 in which the process determines whether there is a new event to be processed. If not ("No" branch 404), then the process sleeps (at block 406) for a predetermined wait time and control returns to block 402.

If at block 402 it is determined that a new event (a system event) is to be processed ("Yes" branch 408) then control proceeds to block 410 in which the process determines if the new system event is to reserve an FRU. If not ("No" branch 412), then the existing process is followed to generate a case (at block 414), the case being a recordation of an action to be performed.

If at block 410, a determination is made that the new event is to reserve FRU ("Yes" branch 416) then control proceeds to block 418 in which the process connects to a parts management database and queries for one or more blockchain certified FRUs.

From block 418, control proceeds to block 420 in which a determination is made as to whether there are one or more blockchain certified FRUs available. If so ("Yes" branch 422) then control proceeds to block 424 where the requested FRUs are reserved. Otherwise ("No" block 426) control proceeds to block 428 in which the process sends an alert to a parts planning team about lack of availability of one or more FRUs.

The query for parts availability may be done primarily on the geographic location of the system reporting the problem. The query settings can be customized based on various criteria like proximity and parts stocking locations, severity of the issue [i.e., whether the same FRU (or FRUs) etc., have been reported multiple times]. The computational device 118 may be used in generating the query.

Figure 5:
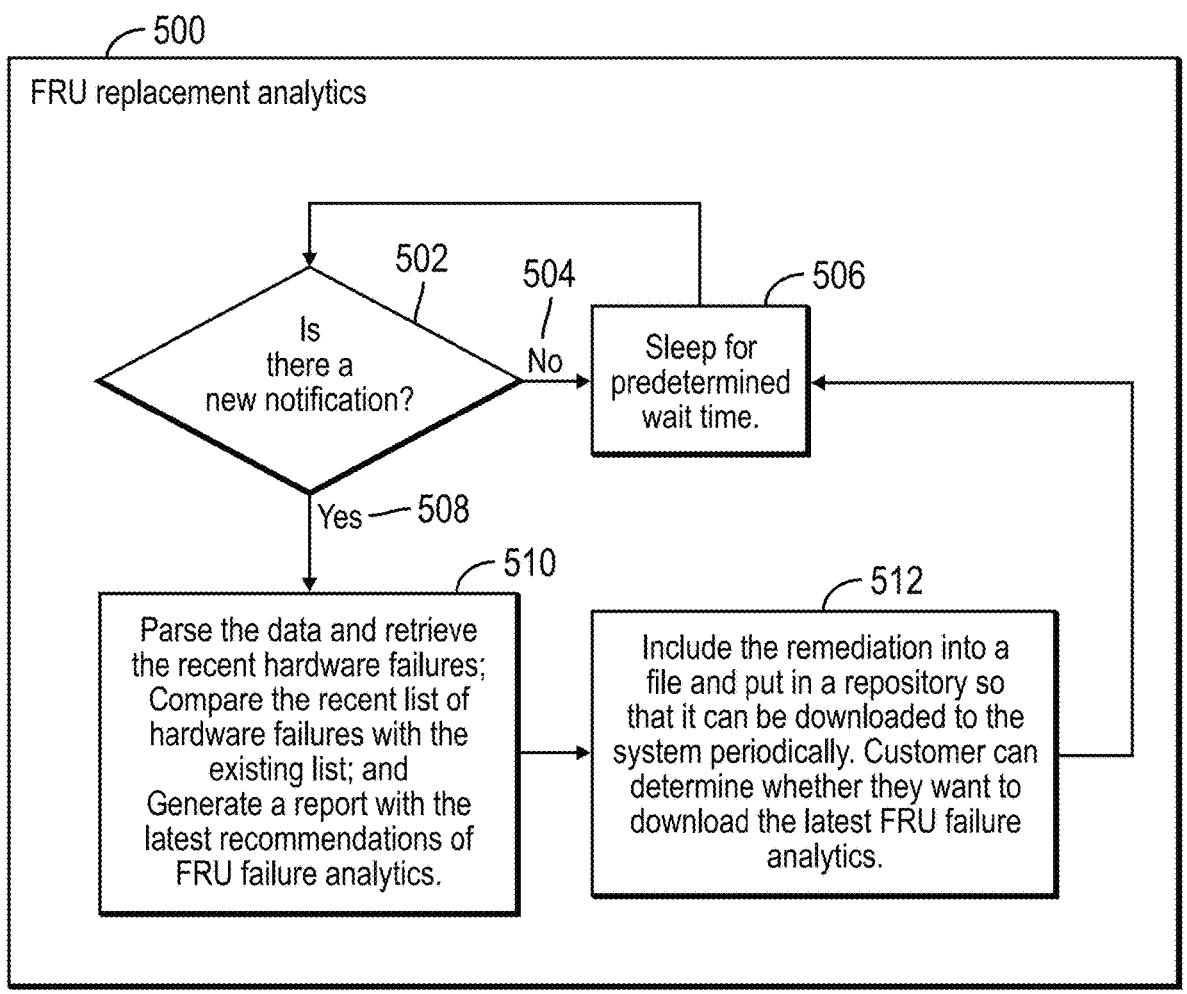
FIG. 5 illustrates a flowchart that shows operations for FRU replacement analytics, in accordance with certain embodiments.

FIG. 5 illustrates a flowchart 500 that shows operations for FRU replacement analytics, in accordance with certain embodiments.

FRU replacement analytics includes a report of hardware failures in the existing system heartbeat or Machine Reported Product Data (MRPD). The analytics tool of certain embodiments parses the data reported by a plurality of storage systems (e.g., storage controllers) and tries to look for patterns using a set of rules. Based on the analysis, the tool generates guidelines that may get embedded within a storage controller user layer error monitoring daemon. The guidelines may be generated as a file that may get downloaded periodically to a storage controller 102, as long as the customer enables the function.

Control starts at block 502 in which the process determines whether there is a new notification (e.g., a MRPD). If not ("No" branch 504) then the process sleeps for a predefined wait time (at block 506) and control returns to block 502.

If there is a new notification "Yes" branch 508) as determined at block 502, then control proceeds to block 510 in which the process parses the data and retrieves the recent hardware failures. The recent list of hardware failures is compared with the existing list of hardware failures. A report is generated with the latest recommendation of FRU failure analytics.

From block 510 control proceeds to block 512 in which the process includes the remediation measures into a file and puts it in a repository so that it can be downloaded to the system periodically. A customer may determine when they want to download the latest FRU analytics.

Figure 6:
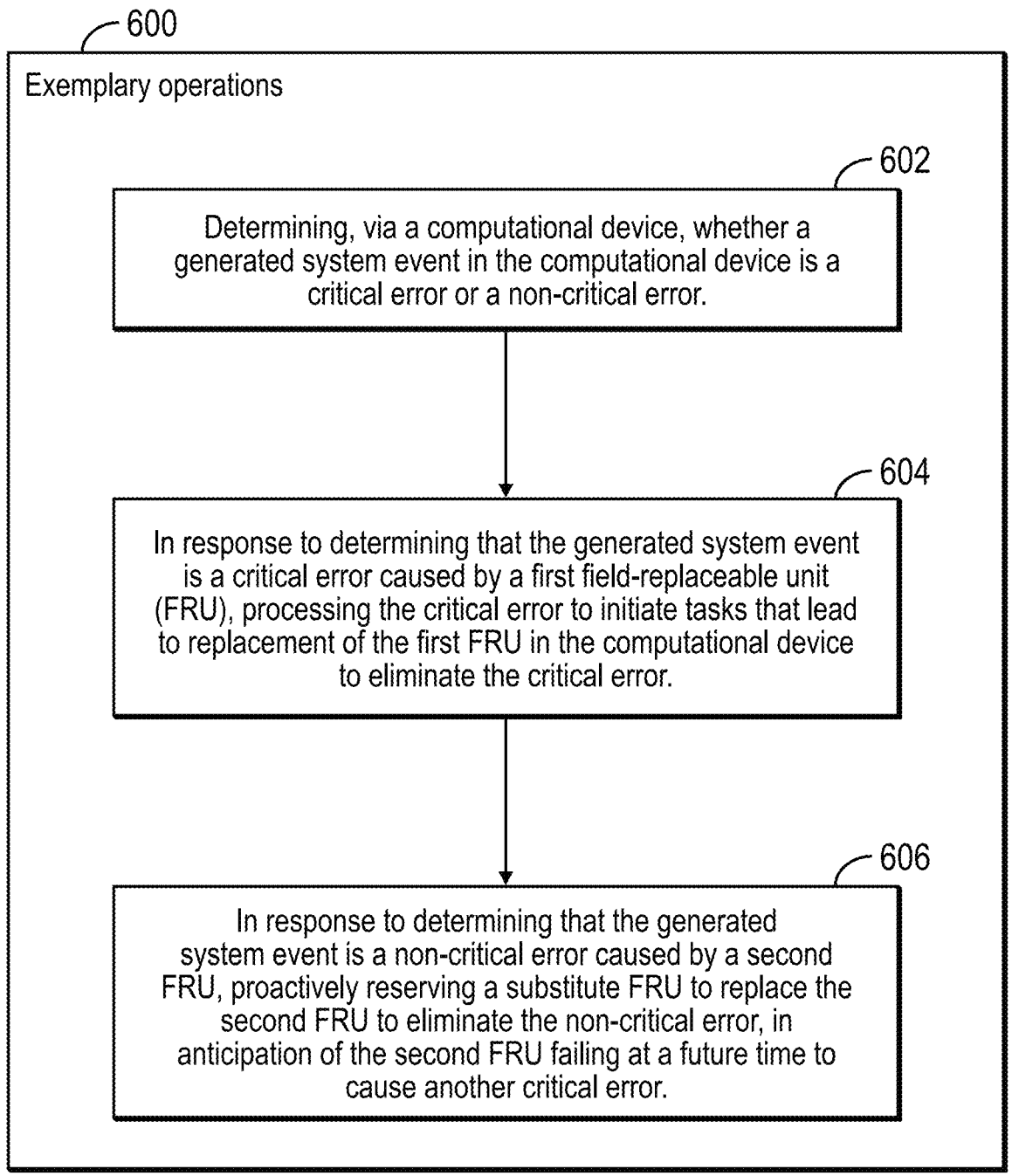
FIG. 6 illustrates a flowchart that shows operations for proactive reservation of FRU, in accordance with certain embodiments.

FIG. 6 illustrates a flowchart 600 that shows operations for proactive reservation of FRU, in accordance with certain embodiments.

Control starts at block 602 in which a computational device determines whether a generated system event in the computational device is a critical error or a non-critical error. In response to determining (at block 604) that the generated system event is a critical error caused by a first field-replaceable unit (FRU), the critical error is processed to initiate tasks that lead to replacement of the first FRU in the computational device to eliminate the critical error. In response to determining (at block 606) that the generated system event is a non-critical error caused by a second FRU, operations are performed to proactively reserve a substitute FRU to replace the second FRU to eliminate the non-critical error, in anticipation of the second FRU failing at a future time to cause another critical error.

Therefore, FIGS. 1-6 illustrate embodiments for proactive reservation of FRUs using predictive failure analysis and analytics.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 7:
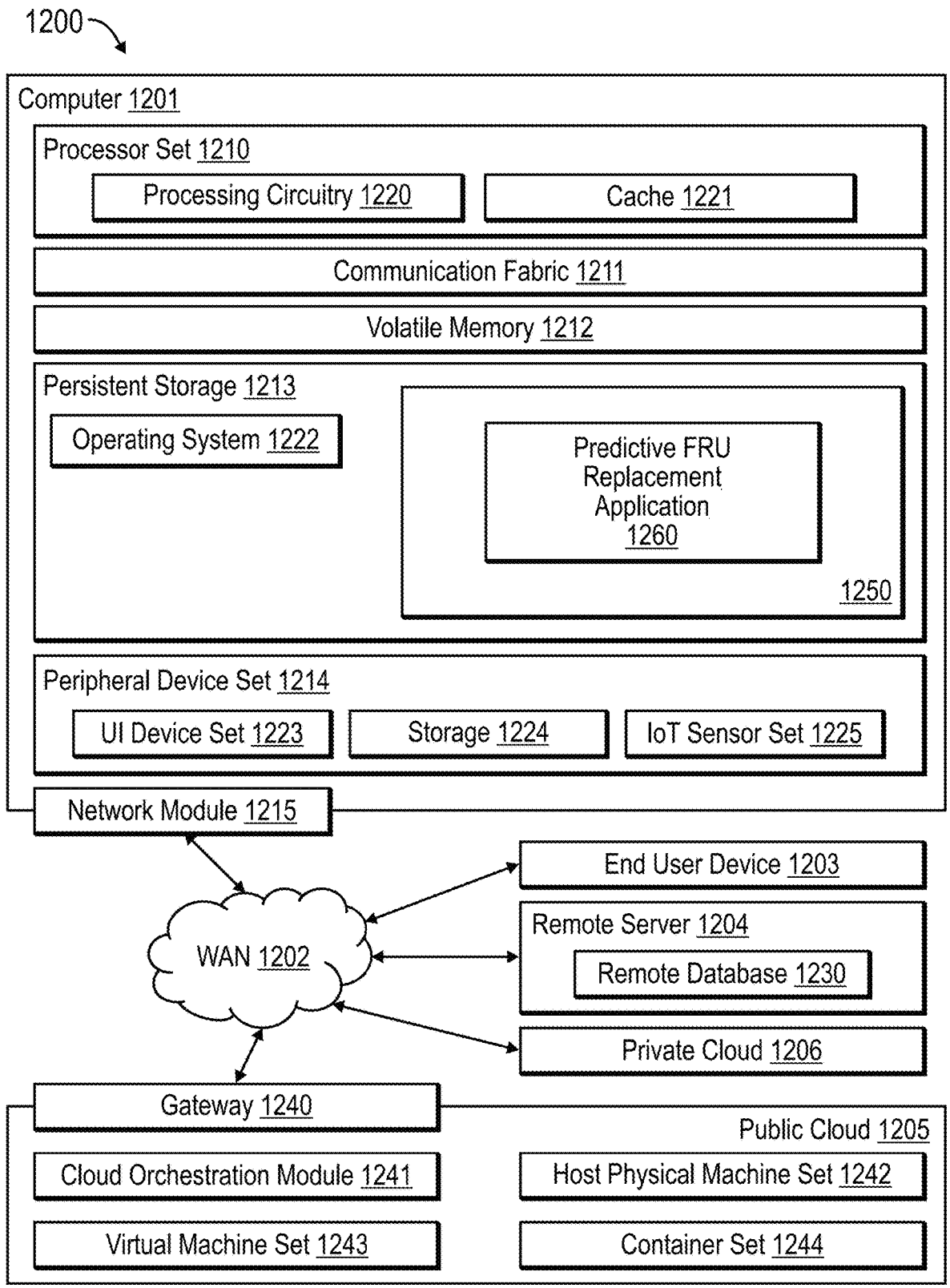
FIG. 7 illustrates a computing environment in which certain components may be implemented, in accordance with certain embodiments.

In FIG. 7, computing environment 1200 contains an example of an environment for the execution of at least some of the computer code (block 1250) involved in performing the predictive FRU replacement application 1260 that performs operations shown in FIGS. 1-6.

In addition to block 1250, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1250, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1250 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface-type operating systems that employ a kernel. The code included in block 1250 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. I/O T sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:
1. A method, comprising:
   determining, via a computational device, whether a generated system event in the computational device is a critical error or a non-critical error;

in response to determining that the generated system event is a critical error caused by a first field-replaceable unit (FRU), processing the critical error to initiate tasks that lead to replacement of the first FRU in the computational device to eliminate the critical error; and in response to determining that the generated system event is a non-critical error caused by a second FRU, proactively reserving a substitute FRU to replace the second FRU to eliminate the non-critical error, in anticipation of the second FRU failing at a future time to cause another critical error, by performing:

querying a parts management database to determine whether a blockchain certified FRU to replace the second FRU is available; and in response to determining that the blockchain certified FRU to replace the second FRU is available, reserving the blockchain certified FRU as the substitute FRU for replacement of the second FRU, wherein an alert is transmitted proactively in anticipation of a failure of the second FRU.

2. The method of claim 1, the method further comprising:

in response to determining that the blockchain certified FRU to replace the second FRU is not available, transmitting an alert that indicates unavailability of parts availability to substitute the second FRU.

3. The method of claim 2, wherein incidences of prior actual replacements of the second FRU are taken into consideration to determine whether to request anticipatory replacement of the second FRU.

4. The method of claim 1, the method further comprising:
executing analytics on the generated system event and associated severity of errors, based on recent hardware failures and other factors, and storing a remediation in a file that is downloadable on demand.

5. The method of claim 1, wherein the computational device is a storage controller, and wherein a proactive reservation of FRUs is performed by using predictive failure determination mechanisms and a continuous FRU analytics learning model.

6. The method of claim 1, wherein incidences of prior actual replacements of the second FRU are taken into consideration to determine whether to request anticipatory replacement of the second FRU.

7. A system, comprising:
a memory; and
a processor coupled to the memory, wherein the processor performs operations, the operations comprising:
determining whether a generated system event is a critical error or a non-critical error;
in response to determining that the generated system event is a critical error caused by a first field-replaceable unit (FRU), processing the critical error to initiate tasks that lead to replacement of the first FRU to eliminate the critical error; and
in response to determining that the generated system event is a non-critical error caused by a second FRU, proactively reserving a substitute FRU to replace the second FRU to eliminate the non-critical error, in anticipation of the second FRU failing at a future time to cause another critical error, by performing:
querying a parts management database to determine whether a blockchain certified FRU to replace the second FRU is available; and
in response to determining that the blockchain certified FRU to replace the second FRU is available, reserving the blockchain certified FRU as the substitute FRU for replacement of the second FRU, wherein an alert is transmitted proactively in anticipation of a failure of the second FRU.

8. The system of claim 7, the operations further comprising:
in response to determining that the blockchain certified FRU to replace the second FRU is not available, transmitting an alert that indicates unavailability of parts availability to substitute the second FRU.

9. The system of claim 8, wherein incidences of prior actual replacements of the second FRU are taken into consideration to determine whether to request anticipatory replacement of the second FRU.

10. The system of claim 7, the operations further comprising:
executing analytics on the generated system event and associated severity of errors, based on recent hardware failures and other factors, and storing a remediation in a file that is downloadable on demand.

11. The system of claim 7, wherein the system is a storage controller, and wherein a proactive reservation of FRUs is performed by using predictive failure determination mechanisms and a continuous FRU analytics learning model.

12. The system of claim 7, wherein incidences of prior actual replacements of the second FRU are taken into consideration to determine whether to request anticipatory replacement of the second FRU.

13. A computer program product comprising a computer readable storage medium having computer readable program code embodied therewith, the computer readable program code when executed is configured to perform operations, the operations comprising:
determining, via a computational device, whether a generated system event in the computational device is a critical error or a non-critical error;
in response to determining that the generated system event is a critical error caused by a first field-replaceable unit (FRU), processing the critical error to initiate tasks that lead to replacement of the first FRU in the computational device to eliminate the critical error; and
in response to determining that the generated system event is a non-critical error caused by a second FRU, proactively reserving a substitute FRU to replace the second FRU to eliminate the non-critical error, in anticipation of the second FRU failing at a future time to cause another critical error, by performing:
querying a parts management database to determine whether a blockchain certified FRU to replace the second FRU is available; and
in response to determining that the blockchain certified FRU to replace the second FRU is available, reserving the blockchain certified FRU as the substitute FRU for replacement of the second FRU, wherein an alert is transmitted proactively in anticipation of a failure of the second FRU.

14. The computer program product of claim 13, the operations further comprising:
in response to determining that the blockchain certified FRU to replace the second FRU is not available, transmitting an alert that indicates unavailability of parts availability to substitute the second FRU.

15. The computer program product of claim 14, wherein incidences of prior actual replacements of the second FRU are taken into consideration to determine whether to request anticipatory replacement of the second FRU.

16. The computer program product of claim 13, the operations further comprising:

executing analytics on the generated system event and associated severity of errors, based on recent hardware failures and other factors, and storing a remediation in a file that is downloadable on demand.

17. The computer program product of claim 13, wherein incidences of prior actual replacements of the second FRU are taken into consideration to determine whether to request anticipatory replacement of the second FRU.

* * * * *